US012768511B2

(12) United States Patent
Jiyoung et al.

(10) Patent No.: US 12,768,511 B2
(45) Date of Patent: Oct. 20, 2026

(54) METHOD FOR DISPLAY-OPTIMIZING CONTROL OF MOTOR VEHICLE LIGHT MODULE

(71) Applicant: ZKW Group GmbH, Wieselburg (AT)

(72) Inventors: Jeong Jiyoung, Suwon City (KR); Jeong Dongman, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 317 days.

(21) Appl. No.: 18/671,154

(22) Filed: May 22, 2024

(65) Prior Publication Data

US 2024/0401765 A1 Dec. 5, 2024

(30) Foreign Application Priority Data

May 30, 2023 (EP) .................................... 23176140

(51) Int. Cl.
*F21S 41/675* (2018.01)
*F21S 41/153* (2018.01)
*F21S 41/663* (2018.01)

(52) U.S. Cl.
CPC ........... *F21S 41/675* (2018.01); *F21S 41/153* (2018.01); *F21S 41/663* (2018.01)

(58) Field of Classification Search
CPC ... G02B 26/0875; F21V 23/003; F21V 14/06; F21W 2107/10; F21Y 2115/10; B60Q 1/04; B60Q 2300/05; H05B 47/105
See application file for complete search history.

(56) References Cited

U.S. PATENT DOCUMENTS 10,596,956 B1 3/2020 Ahn et al.
2015/0373793 A1* 12/2015 Bower ...................... F21V 9/08 362/20

FOREIGN PATENT DOCUMENTS

WO WO-2020200677 A2 * 10/2020 ........... H05B 47/165
WO WO-2022157339 A1 * 7/2022 ............ B60Q 1/115

OTHER PUBLICATIONS

Extended European Search Report for European Patent Application No. 23176140.4 dated Nov. 17, 2023 (6 Pages).

(Continued)

*Primary Examiner* — Hitesh Patel
*Assistant Examiner* — Tabitha Kress
(74) *Attorney, Agent, or Firm* — Eversheds Sutherland (US) LLP

(57) ABSTRACT

Methods are provided for display-optimizing control of a motor vehicle light module (1), wherein the motor vehicle light module is configured to emit a segmented light distribution with individually controllable light segments (51, 53), wherein the motor vehicle light module includes a deflection unit (4) with which a native resolution of the motor vehicle light module can be visually increased by at least temporary beam deflection by means of the deflection unit, wherein the motor vehicle light module is configured to receive setpoint images (S1, S2, S3, Sn, Sn+1) from a superordinate control unit (10), which setpoint images respectively correspond to a light distribution and have a resolution that exceeds the native resolution of the motor vehicle light module. The methods improve the light emission of a segmented and time-variable light distribution by processing the setpoint images in several steps.

12 Claims, 3 Drawing Sheets

(56) References Cited

OTHER PUBLICATIONS

Grundhofer et al., "Recent Advances in Projection Mapping Algorithms, Hardware and Applications," Computer Graphics Forum: J. European Association for Computer Graphics, vol. 37, No. 2 (2018).

* cited by examiner

Fig. 1
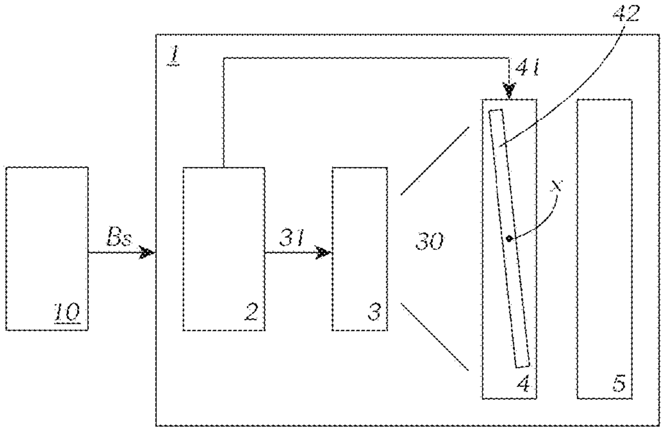
Fig. 2a
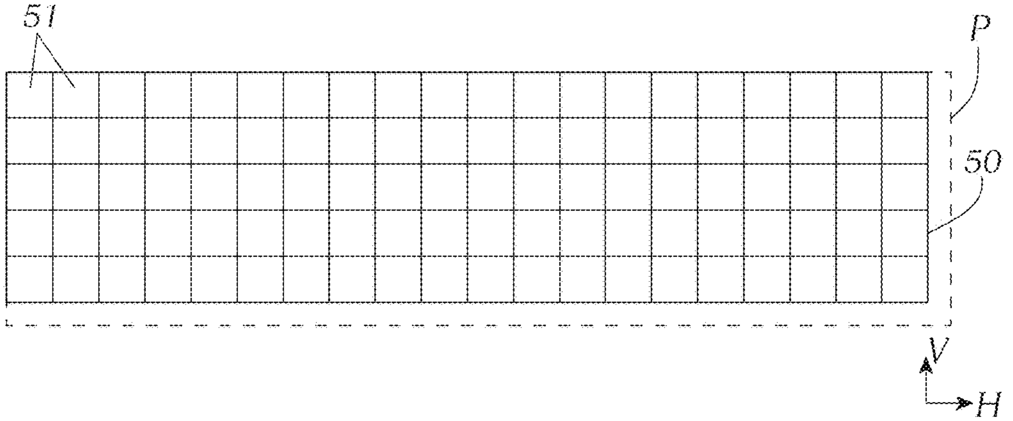
Fig. 2b
Fig. 2c
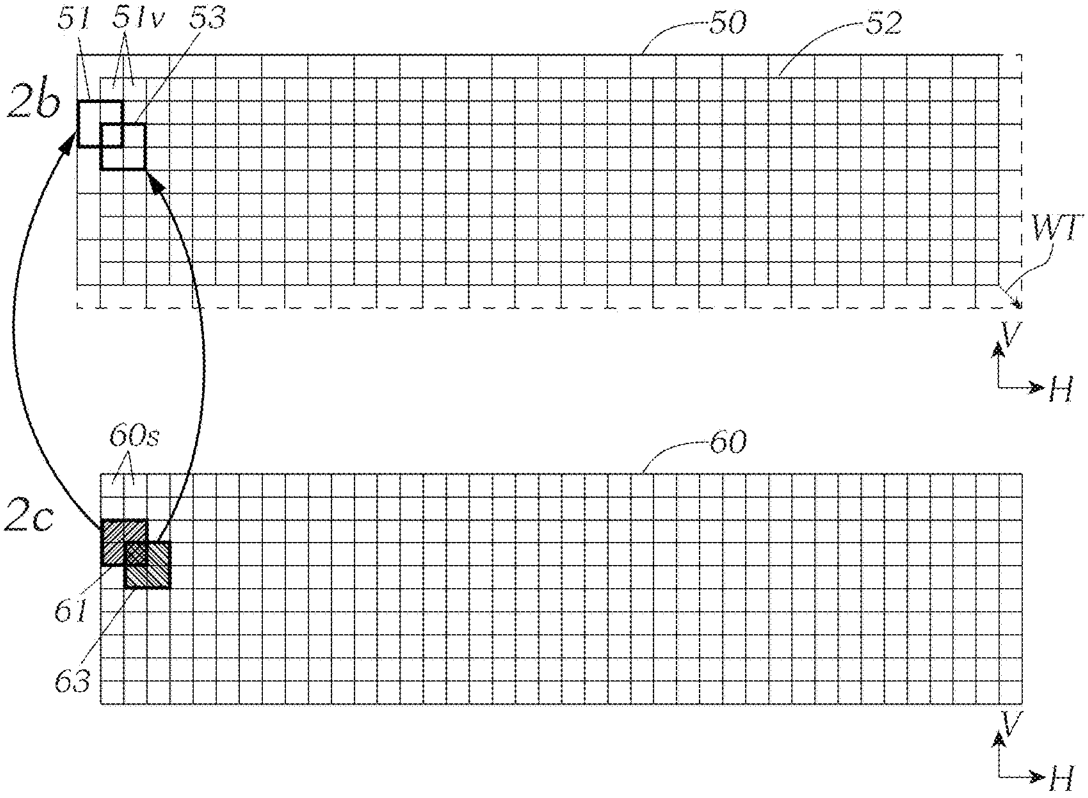

METHOD FOR DISPLAY-OPTIMIZING CONTROL OF MOTOR VEHICLE LIGHT MODULE

CROSS-REFERENCE TO RELATED APPLICATIONS

This application claims priority to European Patent Application No. 23176140.4, filed May 30, 2023, which is incorporated herein by reference.

FIELD OF THE INVENTION AND DESCRIPTION OF PRIOR ART

The invention relates to a method for display-optimizing control of a motor vehicle light module, wherein the motor vehicle light module is configured to emit a segmented light distribution with individually controllable light segments.

Methods for controlling motor vehicle light modules have become known from the prior art which enable a time-variable change in the light emission of individual light segments of a light distribution. This time-variable change enables the light distribution to be adapted to a wide variety of driving situations. For example, oncoming road users or those in front can be blanked out or specifically illuminated if required. With a sufficiently large number of light segments of a light distribution, time-variable information displays are also possible in the form of animated symbols projected onto a surface.

The resolution of the light distribution is usually limited by the resolution of the motor vehicle light module in question. The rate of change of the time-variable change in light emission is also limited by predetermined interfaces.

In order to improve the light emission, the components of the motor vehicle light module in question have so far been modified, for example by using components that enable better resolution, improved contrast, increased light intensities, a smoother display and so on.

SUMMARY OF THE INVENTION

It is an object of the invention to provide a method which can be used to further improve the light emission of a motor vehicle light module for emitting a segmented and time-variable light distribution.

This object is achieved with two methods (a first method and an alternative method) which are based on the same idea.

The object is firstly achieved with a method of the type mentioned in the introduction by virtue of the fact that the motor vehicle light module comprises a deflection unit with which a native resolution of the motor vehicle light module can be visually increased by at least temporary beam deflection by means of the deflection unit, wherein the motor vehicle light module is configured to receive setpoint images from a superordinate control unit, which setpoint images respectively correspond to a light distribution and have a resolution that exceeds the native resolution of the motor vehicle light module, wherein the method comprises the following steps:

a) receiving a setpoint image, also referred to as an initial image, and a subsequent setpoint image, also referred to as a subsequent image;
b) converting the initial image received according to step a) into a low-resolution image based on a first conversion rule, wherein this low-resolution image is selected in such a way that it has the native resolution of the motor vehicle light module;
c) forming an intermediate setpoint image from the combination of the initial image received according to step a) and the subsequent image received according to step a);
d) converting the intermediate setpoint image formed according to step c) into a further low-resolution image based on a second conversion rule, wherein this further low-resolution image is selected in such a way that it has the native resolution of the motor vehicle light module; and
e) controlling the motor vehicle light module, the controlling being carried out in such a way that a temporal sequence of the low-resolution images converted according to step b) and d) is emitted by the motor vehicle light module in coordination with the temporary beam deflection by the deflection unit, wherein the temporal sequence of the emission of the low-resolution images converted according to step b) and d) is selected in such a way that the low-resolution image converted according to step b) and the further low-resolution image converted according to step d) are emitted alternately in time.

To make the method particularly robust with regard to continuously incoming setpoint images, it can be provided that the method comprises a further step f) in which at least one further setpoint image is received and then an identical number of iterations of steps a) to e) is carried out according to the number of further setpoint images in accordance with the following specification: each received setpoint image corresponding to the temporal sequence is utilized in such a way that the current subsequent image received according to the previous step a) is used as the new initial image in a new iteration of steps a) to e), and that the subsequent setpoint image received according to step f) is used as the new subsequent image in the new iteration of steps a) to e).

In addition, it can advantageously be provided that the method comprises in each of the iterations according to step f), temporally after step a), a further step a1), in which a check is made for an enable signal, in order then, if there is a positive enable signal, to continue with steps b) to e) in the iteration and, if there is a negative enable signal, to skip step c) in the iteration of steps b) to e) and, in step d), to replace the intermediate setpoint image with the subsequent image received in this iteration according to step a), wherein there is a positive enable signal if the subsequent image is different from the initial image and there is a negative enable signal if the subsequent image is not different from the initial image.

Furthermore, the at least one further setpoint image received according to step f) can be predictively generated from image data of the current initial image received according to the previous step a) and the current subsequent image received according to the previous step a).

Efficient execution of the method is made possible if step c) and step d) are carried out simultaneously.

In step c), the combination is preferably performed by at least partially interpolating the setpoint image contents from the initial image and the subsequent image.

Based on the same idea, the object can alternatively be achieved with a method of the type mentioned in the introduction by virtue of the fact that the motor vehicle light module comprises a deflection unit with which a native resolution of the motor vehicle light module can be visually increased by at least temporary beam deflection by means of the deflection unit, wherein the motor vehicle light module is configured to receive setpoint images from a superordinate control unit, which setpoint images respectively correspond to a light distribution and have a resolution that exceeds the native resolution of the motor vehicle light module, wherein the method comprises the following steps:

A) receiving a setpoint image, also referred to as an initial image, and a subsequent setpoint image, also referred to as a subsequent image;

B) converting the initial image received according to step A) into a low-resolution intermediate image based on a first conversion rule and into a low-resolution intermediate image based on a second conversion rule, wherein these low-resolution intermediate images are selected in such a way that they have the native resolution of the motor vehicle light module;

C) converting the subsequent image received according to step A) into a further low-resolution intermediate image based on the first conversion rule and into a further low-resolution intermediate image based on the second conversion rule, wherein the further low-resolution intermediate images are selected in such a way that they have the native resolution of the motor vehicle light module;

D) forming a low-resolution image from the combination of a low-resolution intermediate image, converted based on the first conversion rule according to step B), and a further low-resolution intermediate image, converted based on the first conversion rule according to step C), wherein the low-resolution image is selected in such a way that it has the native resolution of the motor vehicle light module;

E) forming a further low-resolution image from the combination of a low-resolution intermediate image, converted based on the second conversion rule according to step B), and a further low-resolution intermediate image, converted based on the second conversion rule according to step C), wherein the further low-resolution image is selected in such a way that it has the native resolution of the motor vehicle light module; and F) controlling the motor vehicle light module, the controlling being carried out in such a way that a temporal sequence of the low-resolution images formed according to step D) and E) is emitted by the motor vehicle light module in coordination with the temporary beam deflection by the deflection unit, wherein the temporal sequence of the emission of the low-resolution images formed according to step D) and E) is selected in such a way that the low-resolution image formed according to step D) and the further low-resolution image formed according to step E) are emitted alternately in time.

To also make the alternative method particularly robust with regard to continuously incoming setpoint images, it can be provided that the alternative method comprises a further step G) in which at least one further setpoint image is received and then an identical number of iterations of steps A) to F) is carried out according to the number of further setpoint images in accordance with the following specification: each received setpoint image corresponding to the temporal sequence is utilized in such a way that the current subsequent image received according to the previous step A) is used as the new initial image in a new iteration of steps A) to F), and that the subsequent setpoint image received according to step G) is used as the new subsequent image in the new iteration of steps A) to F).

Both in the first and the alternative method, preferably, the initial image is different from the subsequent image in each iteration, thus resulting in a time-variable light distribution. By way of example, it is necessary to limit the number of setpoint images received per second due to predetermined interfaces. Thanks to the invention, a smoother display of time-variable light distribution can be achieved even with a limited number of setpoint images received per second. The limited number of setpoint images received per second can be no more than 60 setpoint images per second, preferably no more than 30 setpoint images per second, particularly preferably no more than 20 setpoint images per second.

In addition, it can advantageously be provided that the alternative method comprises in each of the iterations according to step G), temporally after step A), a further step A1) in which a check is made for an enable signal, in order then, if there is a positive enable signal, to continue with steps B) to F) in the iteration and, if there is a negative enable signal, to skip steps C) and E) in the iteration of steps B) to F) and, in step F), instead of the temporal sequence of the low-resolution images, to emit a temporal sequence of the low-resolution intermediate images converted according to step B) in coordination with the temporary beam deflection by the deflection unit through the motor vehicle light module, wherein there is a positive enable signal if the subsequent image is different from the initial image and there is a negative enable signal if the subsequent image is not different from the initial image.

The at least one further setpoint image received according to step G) can be predictively generated from image data of the current initial image received according to the previous step A) and the current subsequent image received according to the previous step A).

In at least one step of steps D) and E), the combination is preferably performed by at least partially interpolating the image contents of the low-resolution intermediate images.

In the present disclosure, the expression “native resolution” is understood to mean the resolution that is achieved by the sum of the individually controllable light segments for light emission. If, for example, the light segments are arranged in two rows and two columns and are individually controllable, this corresponds to a native resolution of 2×2, wherein each individually controllable light segment can also be referred to as a light pixel. The motor vehicle light module preferably has a native resolution of at least 2×2; it is particularly preferably a high-resolution motor vehicle light module.

The resolution that is perceived by the human eye can be increased compared to the native resolution by the at least temporary beam deflection by means of the deflection unit.

The invention further relates to a motor vehicle with a motor vehicle light module, wherein the motor vehicle light module is configured to emit a segmented light distribution, wherein the motor vehicle light module comprises a deflection unit with which a native resolution of the motor vehicle light module can be visually increased by at least temporary beam deflection by means of the deflection unit, wherein the motor vehicle has means to carry out at least one of the aforementioned methods. The motor vehicle is configured to carry out the aforementioned method, i.e. suitable means are provided in the motor vehicle which are also configured accordingly.

The motor vehicle light module is preferably designed for use in a motor vehicle light, in particular in a signalling light or in a motor vehicle headlight. Accordingly, the motor vehicle light module can also be part of the aforementioned devices.

BRIEF DESCRIPTION OF THE DRAWINGS

The invention is outlined in more detail below based on exemplary and non-limiting embodiments which are illustrated in the figures. In the figures FIG. 1 shows a block diagram of a motor vehicle light module with a superordinate control unit for use in connection with the present invention, FIG. 2*a* schematically shows a native resolution of a low-resolution image or its projection, FIG. 2*b* schematically shows an overlap of two low-resolution images or their projection, FIG. 2*c* schematically shows the resolution of a setpoint image.

DETAILED DESCRIPTION OF EMBODIMENTS OF THE INVENTION

Figure 3A:
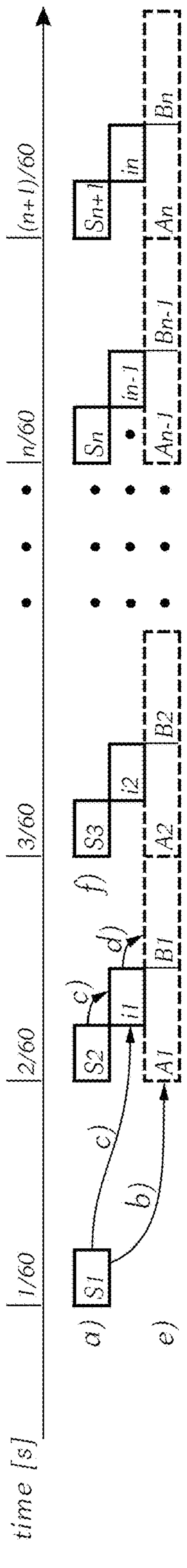
FIG. 3*a* shows a time chart for the first method with a sequence of steps which are carried out according to the invention.

FIG. 1 shows a block diagram of the motor vehicle light module 1. The motor vehicle light module 1 is configured to emit a segmented light distribution with individually controllable light segments. The motor vehicle light module 1 comprises a module control unit 2, a light source 3, a deflection unit 4 and a projection unit 5. The motor vehicle light module 1 is configured to receive an image signal Bs from a superordinate control unit 10. The superordinate control unit 10 is configured to emit the image signal Bs.

The image signal Bs contains setpoint images, which setpoint images respectively correspond to a light distribution and have a resolution that exceeds the native resolution of the motor vehicle light module 1. The different resolutions are explained in more detail in FIG. 2*a* to FIG. 2*c*.

A wide variety of techniques is already known for generating a segmented light distribution. These include in particular spatial modulation by means of LEDs (light-emitting diodes) arranged in a matrix, spatial light modulation by means of an LCD (liquid crystal display), or spatial light modulation by means of DLP (digital light processing) or DMD (digital mirror device). Alternatively, light beam modulation techniques have also become known, i.e. scanning systems that scan light beams or light rays with a frequency that is imperceptible to the human eye onto an area such that freely variable light distributions are created. The high-resolution motor vehicle light modules known today already allow resolutions with several thousand individually switchable and dimmable light segments, preferably arranged in an aspect ratio of 1:4, wherein the larger extension extends horizontally.

Horizontal and vertical can refer to the intended installation position of the motor vehicle light module 1, wherein the only essential aspect is that horizontal and vertical refer to orientations that are orthogonal to each other.

The light source 3 shown in FIG. 1 can comprise several elements. For example, the light source 3 comprises a light-emitting element and a downstream spatial modulator (not shown), such as an LCD, DMD or DLP. The light source 3 preferably comprises an array with at least two LEDs, wherein each LED can be controlled individually. The light source 3 particularly preferably comprises an array with more than 1000 individually controllable LEDs, which are arranged in an array with an aspect ratio of 1:4. Furthermore, the light source 3 can alternatively comprise a combination of a light-emitting element, a collimator and a light beam modulator which scans collimated light of the light-emitting element in a scanning form at a frequency that is imperceptible to the human eye onto an area. A light conversion element can be arranged in this area. The light source 3 can thus consist of a plurality of elements. For example, additional elements such as optical lenses or reflectors can be provided which are not shown for the sake of clarity.

It is essential that a light beam 30 is emitted from the light source 3, which light beam 30 comprises at least two light segments in at least one plane perpendicular to the light propagation direction of the light beam 30 that can have light intensities different from each other. This light beam 30 therefore corresponds to a low-resolution image in at least one plane perpendicular to the light propagation direction of the light beam 30.

For this purpose, the light source 3 can receive a light control signal 31 and emit a light beam 30 as a function of the light control signal 31. For this purpose, the light control signal 31 can be representative of the light beam 30 emitted by the light source 3.

The module control unit 2 can be configured to emit the light control signal 31. In particular, the module control unit 2 can receive the image signal Bs of the superordinate control unit 10, evaluate it and emit the light control signal 31 based thereon.

The light beam 30 emitted by the light source 3 is projected by the projection unit 5 within a projection angular range P in front of the motor vehicle light module 1. This means that a specific light distribution or a specific low-resolution image is emitted by the motor vehicle light module 1. Accordingly, this results in a projection 50 of a specific low-resolution image, which projection 50 is projected within a projection angular range P in front of the motor vehicle light module 1. Such a projection unit 5 usually comprises a plurality of optical elements, in particular lenses. For the sake of clarity, this plurality of optical elements is not shown.

The projection angular range P is determined by the aperture of the projection unit 5. The projection angular range P therefore corresponds to the maximum possible projection cone of the projection unit 5. Such a projection cone refers to a cone in the mathematical sense, wherein all sub-variants can also be included. Examples of sub-variants include pyramid cones or truncated cones.

As shown in FIG. 2*a*, the projection 50 of a low-resolution image comprises an array of light segments 51 with 5 rows and 20 columns. The native resolution shown of the motor vehicle light module 1 therefore comprises 20×5 light segments 51. Although only 100 light segments 51 are shown, the light source 3 can be designed in such a way that several thousand light segments 51 are projected or emitted by the motor vehicle light module 1 within the projection angular range P.

The deflection unit 4 shown in FIG. 1 can now temporarily deflect the light beam 30 emitted by the light source 3 and thus also the projection 50. This means that the native resolution of the motor vehicle light module 1 can be visually increased by at least temporary beam deflection by means of the deflection unit 4.

The deflection unit 4 is preferably arranged in the beam path of the light beam 30 between the light source 3 and at least a part of the projection unit 5. At least a part of the projection unit 5 means that it can consist of a plurality of optical elements, as explained above, between which the deflection unit 4 can be arranged.

The deflection unit 4 can receive a deflection control signal 41 and deflect the light beam 30 emitted by the light source 3 as a function of the deflection control signal 41. This means that the projection 50 of a low-resolution image can also be deflected temporarily within the projection angular range P as a function of the deflection control signal 41.

The module control unit 2 can be configured to emit the deflection control signal 41. The deflection unit 4 can comprise a glass plate 42 which consists of a material that is transparent for the emitted light beam 30 from the light source 3. This glass plate can be designed as a plane-parallel plate and be mounted so as to pivot about at least one pivot axis x by a corresponding mechanical suspension, wherein this pivot axis x is preferably perpendicular to the light propagation direction of the light beam 30 emitted by the light source 3. For example, the deflection unit 4 can further have an electromagnetic actuator which temporarily pivots the glass plate 42 about the at least one pivot axis x depending on the deflection control signal 41. By pivoting, the angle of entry of the light beam 30 into the glass plate can be temporarily changed, whereby the light beam 30 can be deflected as the light passes through the glass plate 42 parallel to the light propagation direction of the light beam 30 in accordance with the refraction. As a result, the projection 50 of the light beam 30 emitted by the light source or of a low-resolution image can be deflected in front of the motor vehicle light module 1 in order to visually increase the native resolution of the motor vehicle light module 1. This is explained in more detail in FIG. 2*b*.

A person skilled in the art will be familiar with a wide variety of ways to create such a deflection unit 4. For example, prisms are also conceivable which deflect the projection 50 of the light beam 30 emitted by the light source 3 or a low-resolution image within the projection angular range P by changing the lateral position (in relation to the light propagation direction of the light beam 30) and thus also by refraction. Reflective solutions of a deflection unit 4 are also possible.

The illuminable angular range within the projection angular range P is expanded, as shown in FIG. 2*b*, by at least temporarily deflecting the projection 50 of a low-resolution image within the projection angular range P. In particular, with a sufficiently quick and oscillating deflection or with a sufficiently great deflection frequency of at least 60 Hz, preferably 120 Hz, a deflected projection 52 and a non-deflected projection 50 can be superimposed. This allows visual light segments 51*v* to be formed, which visually increase the native resolution of the motor vehicle light module 1. For the sake of simplicity, the term "superimposed" is used, although it is clear that the superimposition results from the inertia of the human eye.

An at least partial deflection of the projection 50, 52 within the projection angular range P therefore means the displacement of the projection 50, 52 in the possible projection cone, i.e. in the angular space resulting from the projection unit 5. The projection angular range P preferably has a horizontal and a vertical extension, wherein the horizontal extension can be greater than the vertical extension. By way of example, the horizontal extension covers an angular range of no more than 50° and the vertical extension covers an angular range of no more than 20°.

For the purpose of this description, the non-deflected projection 50 and the deflected projection 52 respectively show the projection of a low-resolution image. These low-resolution images respectively correspond to a light distribution and have the native resolution of the motor vehicle light module 1. The non-deflected projection 50 thus has non-deflected light segments 51 and the deflected projection 52 thus has deflected light segments 53.

FIG. 2*c* shows the resolution of the light distribution 60 of a setpoint image, which setpoint image corresponds to a light distribution 60 with a plurality of setpoint light segments 60*s*. The resolution of a setpoint image corresponds to the number of setpoint light segments 60*s* and exceeds the native resolution of the motor vehicle light module 1.

Compared with FIG. 2*b*, this resolution of the light distribution 60 of a setpoint image can be achieved approximately by the described superimposition of a deflected projection 52 and a non-deflected projection 50 within the projection angular range P.

"Deflected" and "non-deflected" merely means a deflection relative to one another, regardless of whether a deflection takes place in absolute terms or not. For example, due to requirements, the non-deflected projection 50 can also be deflected by suitable means. What matters is that there is at least one displacement angle WT with a corresponding direction between the deflected projection 52 and the non-deflected projection 50.

The temporary beam deflection can therefore be described using a deflection frequency and using a displacement angle WT with a direction. The direction from the deflected projection 52 to the non-deflected projection 50 thus corresponds to the direction of the temporary beam deflection.

The displacement angle WT is measured by the displacement in relation to a neutral position of the projection 50, 52 within the projection angular range P, wherein the displacement angle WT in this neutral position is 0°. The displacement angle WT is preferably smaller than the largest angular dimension of an individual light segment 51, 53. The displacement angle WT can particularly preferably assume a value between −2° and +2°. The displacement angle WT particularly preferably corresponds substantially to a horizontal offset by half a light segment 51, 53 and/or substantially to a vertical offset by half a light segment 51, 53.

Such a light distribution 60 of a setpoint image usually has a certain information content which is to be displayed by the superimposition of a deflected projection 52 and a non-deflected projection 50 within the projection angular range P. An image for the deflected projection 52 and an image for the non-deflected position 50 must therefore be converted from the setpoint image using appropriately defined conversion rules. The projection 50, 52 thus corresponds at several points in time to different low-resolution images which are emitted by the motor vehicle light module 1 in a temporal sequence. This temporal sequence of the emission takes place in coordination with the temporary beam deflection by the deflection unit 4 in order to obtain at least approximately the light distribution 60 of the setpoint image through the described superimposition.

"In coordination with" is therefore understood to mean a temporally at least approximately synchronous beam deflection by the deflection unit 4 with the emission of the low-resolution images or their projection 50, 52.

Each setpoint light segment 60*s* and each light segment 51, 53 of a light distribution has a certain light intensity value which can be processed in the individual steps according to the first method and the alternative method. In the description of the methods, reference is made to the setpoint light segments 60*s* and the light segments 51, 53 for the sake of simplicity even though their light intensity value is clearly meant.

The first method will now be discussed with reference to FIGS. 3*a* and 3*b*.

According to a first step, referred to as step a), a setpoint image S1 is received at time 1/60 s, this setpoint image S1 can be referred to as an initial image. Furthermore, in this step a), a subsequent setpoint image S2 is received at time 2/60 s, which can be referred to as a subsequent image.

The setpoint images S1, S2 respectively correspond to a light distribution and have a resolution that exceeds the native resolution of the motor vehicle light module 1. All setpoint images S1, S2 preferably have the same resolution.

In a subsequent step, referred to as step b), the initial image S1 is converted into a low-resolution image A1 based on a first conversion rule. This low-resolution image A1 is selected such that it has the native resolution of the motor vehicle light module 1. In the present example, the native resolution of the motor vehicle light module 1 comprises 5×20 light segments.

An intermediate setpoint image i1 is formed in a further step, referred to as step c). This is formed from the combination of the initial image S1 received according to step a) and the subsequent image S2 received according to step a).

Combination means that the information content of the initial image S1 and the subsequent image S2 is combined together resulting in an intermediate setpoint image i1 which contains information from the initial image S1 and subsequent image S2, wherein the intermediate setpoint image i1 has a resolution that exceeds the native resolution of the motor vehicle light module 1. The intermediate setpoint image i1, the initial image S1 and the subsequent image S2 preferably have the same resolution. Accordingly, the intermediate setpoint image i1 can also correspond to a light distribution with a plurality of setpoint light segments 60*s*.

As described, each setpoint image S1, S2 or the initial image S1 and the subsequent image S2 corresponds to a light distribution with a plurality of setpoint light segments 60*s*. The combination of the initial image S1 received according to step a) and the subsequent image S2 received according to step a) can comprise an at least partial interpolation between the initial image S1 and subsequent image S2. The combination can thus correspond to a method that includes an interpolation function between the light intensity value of a setpoint light segment 60*s* of the initial image S1 and the light intensity value of a setpoint light segment 60*s* of the subsequent image S2 with the same position, wherein the result is then used for the setpoint light segment of the intermediate image i1 formed according to step c) with the same position. Such an interpolation function is preferably applied to all setpoint light segments 60*s* of the initial image S1 and subsequent image S2 with the same position in order to calculate the light intensity values of all setpoint light segments 60*s* of the intermediate image i1 with the same position. There are various rules or methods to form an intermediate setpoint image i1 by combining two setpoint images S1, S2 or the initial image S1 and subsequent image S2. A wide variety of interpolation functions can be used depending on a wide variety of requirements. The interpolation function can include an arithmetic averaging.

In the context of the present disclosure, the expression "with the same position" refers to those elements of two images (setpoint image, initial image, subsequent image, intermediate image; low-resolution image, further low-resolution image) with the same resolution which have the same index if these images are modelled as matrices. Each element has an individual index and in the example of a setpoint image is respectively assigned to a setpoint light segment 60*s* or in the example of a low-resolution image is respectively assigned to a light segment 51.

In a further step, referred to as step d), the intermediate setpoint image i1 formed according to step c) is converted into a further low-resolution image B1. This occurs based on a second conversion rule. The further low-resolution image B1 is selected such that it has the native resolution of the motor vehicle light module 1.

The first conversion rule and the second conversion rule are preferably different, wherein the first conversion rule and the second conversion rule can be selected as a function of the displacement angle WT and its direction or as a function of the temporary beam deflection by means of the deflection unit 4.

The first conversion rule and the second conversion rule can be selected such that a superimposition of the resulting low-resolution image A1 and the further low-resolution image B2, or their projections 50, 52, as shown in FIG. 2*b*, displaced relative to one another, results in a more similar image impression to one of the two underlying setpoint images S1, S2 than the individual low-resolution images A1, B1 on their own.

The first conversion rule can comprise the arithmetic averaging of blocks 61 consisting of 2×2 adjacent setpoint light segments 60*s* of the initial image S1, wherein the resulting arithmetic average is used for a light segment 51 of the low-resolution image A1. According to an exemplary first conversion rule, all light segments 51 of the low-resolution image A1 can be generated according to this method, wherein each light segment 51 of the low-resolution image A1 is generated from an individual block 61 which in turn consists of 2×2 adjacent setpoint light segments 60*s*.

The second conversion rule can also comprise an arithmetic averaging of blocks 63 from the intermediate setpoint image i1. The second conversion rule has been selected in this example as a function of the displacement angle WT and its direction or as a function of the temporary beam deflection by means of the deflection unit 4. A different corresponding block 63, consisting of 2×2 adjacent setpoint light segments 60*s*, is therefore used for the light segment 53 of the further low-resolution image B1 with the same position, compared to the light segment 51 of the low-resolution image A1 with the same position. According to an exemplary second conversion rule, all light segments 53 of the further low-resolution image B1 can be generated according to this method, wherein each light segment 53 of the further low-resolution image B1 is generated from an individual block which in turn consists of 2×2 adjacent setpoint light segments 60*s*, wherein each individual block is selected as a function of the temporary beam deflection by means of the deflection unit 4.

Edge problems that occur due to the position-shifted block processing can be solved with known measures.

Both the first and the second conversion rule can be adapted depending on requirements and the resolution of the setpoint image S1, S2 or the intermediate setpoint image i1. There are also numerous methods that can be used as an alternative to the arithmetic averaging in blocks. For example, a median value can also be calculated in blocks. The size of the blocks 61, 63 can depend on the ratio of the native resolution of the motor vehicle light module 1 to the resolution of the corresponding setpoint image, wherein the size of all blocks 61, 63 is preferably equal to the reciprocal of the ratio of the native resolution of the motor vehicle light module 1 to the resolution of the corresponding setpoint image.

Step c) and step d) can preferably be carried out simultaneously by a rule being applied from the initial image S1 received according to step a) and from the subsequent image S2 received according to step a), which rule includes the combination according to step c) and the second conversion rule according to step d). For example, the arithmetic average of each 2×2 block of the initial image S1 can be calculated together with each 2×2 block of the subsequent image S2 with the same position in order to obtain a light intensity value for each light segment 53 of the further low-resolution image B1.

The motor vehicle light module 1 is subsequently controlled in a further step, referred to as step e). It is controlled in such a way that a temporal sequence of the low-resolution images A1, B1 converted according to step b) and d) is emitted by the motor vehicle light module 1 in coordination with the temporary beam deflection by the deflection unit 4. The temporal sequence of the emission of the low-resolution images A1, B1 converted according to step b) and d) is selected in such a way that the low-resolution image A1 converted according to step b) and the further low-resolution image B1 converted according to step d) are emitted alternately in time.

In accordance with the time chart shown, the low-resolution image A1 converted according to step b) is emitted first by the motor vehicle light module 1 followed by the low-resolution image B1 converted according to step d). Control can take place by means of a corresponding output of the light control signal 31 by the module control unit 2 to the light source 3. A minimum period of time can be provided between the emission of the low-resolution image A1 converted according to step b) and the emission of the low-resolution image B1 converted according to step d), in which minimum period of time there is no emission by the motor vehicle light module 1. The minimum period of time can last no more than 10 ms.

The fundamental aspect is that the emission takes place in coordination with the temporary beam deflection by the deflection unit 4. As already described, this means that the changing emission of the low-resolution images A1, B1 is at least approximately synchronized with the time-varying beam deflection by the deflection unit 4. The module control unit 2 is therefore preferably configured to emit a corresponding deflection control signal 41 to the deflection unit 4 at least approximately synchronized with the light control signal 31 such that a temporal sequence of the low-resolution images A1, B1 converted according to step b) and d) is emitted by the motor vehicle light module 1 in coordination with the temporary beam deflection by the deflection unit 4.

It is also possible to store the low-resolution images A1, B1 converted according to step e) and steps b) and d) before the motor vehicle light module 1 is controlled. The module control unit 2 can have such a memory and be configured to store and recurrently retrieve the converted low-resolution images A1, B1.

At least one further setpoint image S3 can now be received in a further step, referred to as step f). It may be the case in practice that a plurality of further setpoint images S3, . . . . Sn, Sn+1 are received. All setpoint images S1, S2, S3, Sn, Sn+1 preferably have the same resolution. In particular, when a time-variable light distribution is to be emitted, for example projected in the form of animated symbols, a plurality of further setpoint images S3, Sn, Sn+1 can be received. Each setpoint image from the plurality of further setpoint images S3, Sn, Sn+1 in turn has a light distribution 60 with a plurality of setpoint light segments 60*s*.

As shown, the setpoint images S1, S2, S3, Sn, Sn+1 are received at regular time intervals. In the present example, 60 setpoint images are received per second. It is also possible that due to predetermined interfaces, the number of setpoint images S1, S2, S3, Sn, Sn+1 received per second is limited. By way of example, only 30 or 20 images can be received per second. It is also possible that the number of setpoint images S1, S2, S3, Sn, Sn+1 received per second varies.

Based on the at least one further received setpoint image S3, an iteration of steps a) to e) is now carried out with the following specification:

the further received setpoint image S3 is utilized in such a way that the current subsequent image S2 received according to the previous step a) is used (i.e. received) as the new initial image S2 in a new iteration of steps a) to e), and that the subsequent setpoint image S3 received according to step f) is used (i.e. received) as the new subsequent image S3 in the new iteration of steps a) to e).

As a result, a new iteration of steps a) to e) is started and completed according to the time chart shown with a new initial image S2 and a new subsequent image S3.

Accordingly, if there are a plurality of further received setpoint images S3, . . . . Sn, Sn+1, an identical number of iterations of steps a) to e) is carried out in accordance with the same specification.

The number of iterations of steps a) to e) results, in coordination with the temporary beam deflection by the deflection unit 4, in a temporal sequence of the emission of the low-resolution images A1, B1, A2, B2, . . . An−1, Bn−1, An, Bn converted in each iteration according to step b) and d).

The sequence of steps does not have to occur in the specified order. If applicable, various steps can be initiated simultaneously. With the appropriate hardware and configuration of the system, step f) can be initiated before step e) has been completed, for example.

In each iteration according to step f), a further step a1) can be provided, temporally after step a), in which a check is made for an enable signal, in order then, if there is a positive enable signal, to continue with steps b) to e) in the iteration and, if there is a negative enable signal, to skip step c) in the iteration of steps b) to e) and, in step d), to replace the intermediate setpoint image i1, i2, in−1, in with the subsequent image S2, S3, Sn, Sn+1 received in this iteration according to step a).

The enable signal can, for example, be provided by the superordinate control unit 10 or by the module control unit 2. There is a positive enable signal if the subsequent image S2 is different from the initial image S1 and there is a negative enable signal if the subsequent image S2 is not different from the initial image S1. Accordingly, the superordinate control unit 10 or the module control unit 2 can be configured to compare the subsequent image S2 and the initial image S1 before step a1) in order to provide an enable signal based thereon.

The module control unit 2 is preferably configured to check whether there is a positive or negative enable signal.

It can further be provided that the at least one further setpoint image S3 received according to step f) is predictively generated from image data of the current initial image S1 received according to the previous step a) and from image data of the current subsequent image S2 received according to the previous step a).

If there are a plurality of further setpoint images S3, Sn, Sn+1, which lead to an identical number of iterations of steps a) to e), each m-th setpoint image S3, Sn, Sn+1 is particularly preferably predictively generated from the image data of the initial image S1, S2, S3, Sn, Sn+1 and subsequent image S2, S3, Sn, Sn+1 received in the respective iteration according to step a). m is a natural number greater than 1, m is particularly preferably a natural number between 2 and 10.

The image data can comprise the light intensity values of at least a number of the respective setpoint light segments 60*s* in the initial image S1 and in the subsequent image S2. In particular, when roads users are blanked out or specifically illuminated by the motor vehicle light module 1, at least parts of the light distribution 60 of a setpoint light image S1, S2, S3, Sn, Sn+1 are rendered by object data that is related to the respective road users. The image data can thus also comprise such object data.

The superordinate control unit 10 can be configured to predictively generate the at least one further setpoint image S3, Sn, Sn+1 received according to step f).

The module control unit 2 can be configured to carry out steps a) to f). For this purpose, the module control unit 2 can be configured to receive the image signal Bs, to process it and, based thereon, to emit the corresponding light control signal 31 to the light source 3 and the corresponding deflection control signal 41 to the deflection unit 4.

The module control unit 2 can have appropriate hardware for this purpose. For example, the module control unit 2 has a microcontroller and/or FPGA for this purpose.

Figure 3B:
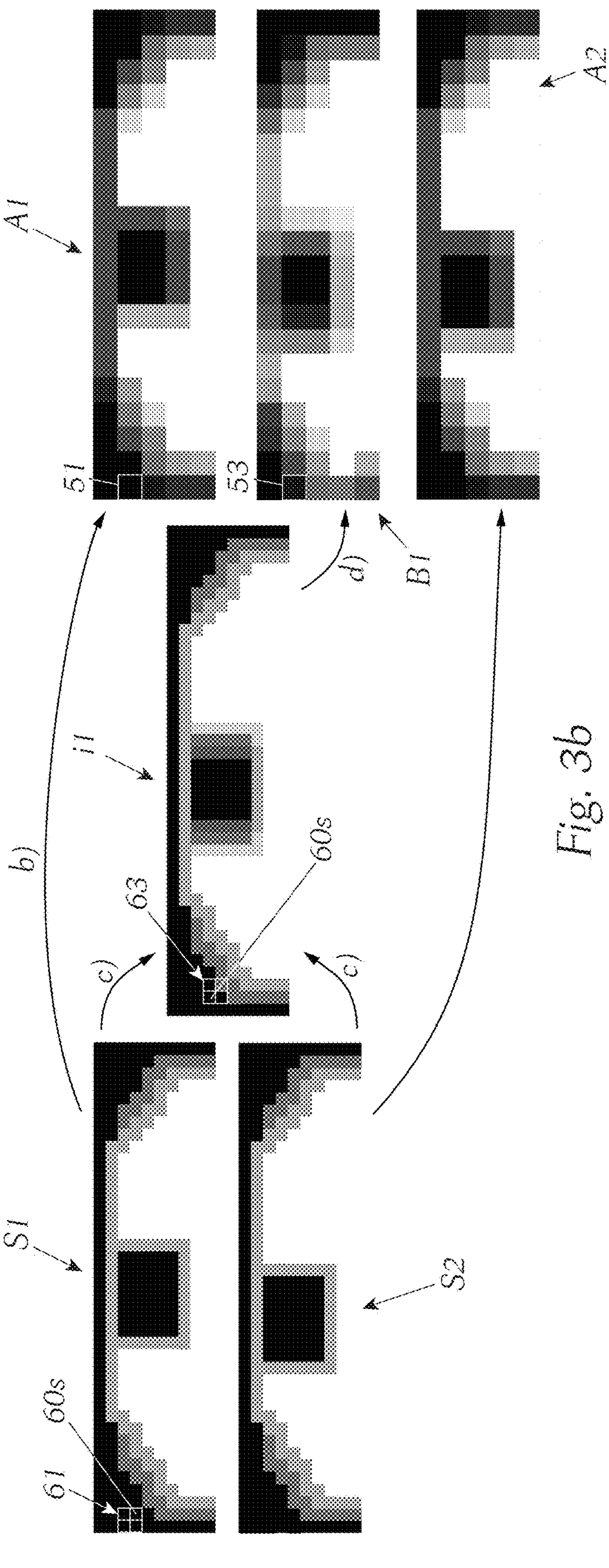
FIG. 3*b* shows a sequence of setpoint images and low-resolution images which are formed/converted or used to control the motor vehicle light module.

FIG. 3*b* shows several setpoint images S1, S2, an intermediate image i1 and low-resolution images A1, B1, A2 by way of example. As shown by the arrows, the setpoint image S1 is converted into a low-resolution image A1 according to step b), an intermediate image i1 is formed from the combination of two setpoint images S1 and S2 according to step c), a further low-resolution image B1 is converted from this intermediate image i1 according to step d), and in a subsequent iteration of the steps, according to step f), a low-resolution image A2 is converted from the setpoint image S2.

Figure 4:
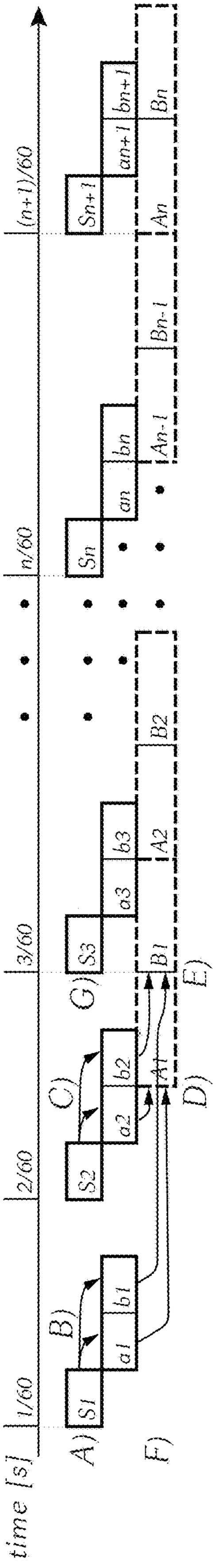
FIG. 4 shows a time chart for the alternative method with a sequence of steps which are carried out according to the invention.

FIG. 4 shows a time chart for the alternative method with a sequence of steps, which are carried out according to the invention. For a better understanding, the same reference numbers are used as in the previous figures, insofar as these are intended to denote fundamentally identical components. However, it is clear that minor differences may arise due to the alternative implementation. All details that have become known from the first method can, if applicable, also materialize in this alternative method. For example, the conversion rules described can also be applied in this method.

The alternative method is based on the same idea as the first method with the difference that low-resolution intermediate images a1, a2 are respectively converted from the setpoint images S1, S2 received according to step A) in the subsequent steps B) and C) based on a first conversion rule and further low-resolution intermediate images b1, b2 are converted based on a second conversion rule. From this, a low-resolution image A1 and a further low-resolution image B2 are then formed according to steps D) and E) by respectively combining a low-resolution intermediate image a1, b1 and a further low-resolution intermediate image a2, b2. Finally, similarly to the first method, the motor vehicle light module 1 is controlled according to step F) in such a way that the low-resolution image A1 is emitted alternately in time with the further low-resolution image B1 in coordination with the temporary beam deflection by the deflection unit 4.

Similarly, the same further features of the embodiments described in the description of the figures for the first method are also applicable in this alternative method. They will therefore not be discussed again in detail. At this point, it should be noted that the invention is not limited to the embodiments shown, but is defined by the entire scope of protection of the claims. Individual aspects of the invention or embodiments may be adopted and combined with each other. Any reference numbers in the claims are exemplary and merely serve to make the claims easier to read, without limiting them.

The invention claimed is:

1. A method for display-optimizing control of a motor vehicle light module (1), wherein the motor vehicle light module (1) is configured to emit a segmented light distribution with individually controllable light segments (51, 53), wherein the motor vehicle light module (1) comprises a deflection unit (4) with which a native resolution of the motor vehicle light module (1) can be visually increased by at least temporary beam deflection by means of the deflection unit (4), wherein the motor vehicle light module (1) is configured to receive setpoint images (S1, S2, S3, Sn, Sn+1) from a superordinate control unit (10), which setpoint images (S1, S2, S3, Sn, Sn+1) respectively correspond to a light distribution and have a resolution that exceeds the native resolution of the motor vehicle light module (1), wherein the method comprises the following steps:

a) receiving a setpoint image (S1, S2, S3, Sn, Sn+1), also referred to as an initial image, and a subsequent setpoint image (S2, S3, Sn, Sn+1), also referred to as a subsequent image;

b) converting the initial image (S1, S2, S3, Sn, Sn+1) received according to step a) into a low-resolution image (A1, A2, An−1, An) based on a first conversion rule, wherein this low-resolution image (A1, A2, An−1, An) is selected in such a way that it has the native resolution of the motor vehicle light module (1);

c) forming an intermediate setpoint image (i1, i2, in−1, in) from the combination of the initial image (S1, S2, S3, Sn, Sn+1) received according to step a) and the subsequent image (S2, S3, Sn, Sn+1) received according to step a);

d) converting the intermediate setpoint image (i1, i2, in−1, in) formed according to step c) into a further low-resolution image (B1, B2, Bn−1, Bn) based on a second conversion rule, wherein this further low-resolution image (B1, B2, Bn−1, Bn) is selected in such a way that it has the native resolution of the motor vehicle light module (1);

e) controlling the motor vehicle light module (1), the controlling being carried out in such a way that a temporal sequence of the low-resolution images (A1, B1, A2, B2, An−1, Bn−1, An, Bn) converted according to step b) and d) is emitted by the motor vehicle light module (1) in coordination with the temporary beam deflection by the deflection unit (4), wherein the temporal sequence of the emission of the low-resolution images (A1, B1, A2, B2, An−1, Bn−1, An, Bn) converted according to step b) and d) is selected in such a way that the low-resolution image (A1, A2, An−1, An) converted according to step b) and the further low-resolution image (B1, B2, Bn−1, Bn) converted according to step d) are emitted alternately in time.

2. The method according to claim 1, wherein the method comprises a further step f) in which at least one further setpoint image (S3, Sn, Sn+1) is received and then an identical number of iterations of steps a) to e) is carried out according to the number of further setpoint images in accordance with the following specification: each received setpoint image (S3, Sn, Sn+1) corresponding to the temporal sequence is utilized in such a way that the current subsequent image received according to the previous step a) is used as the new initial image in a new iteration of steps a) to e), and that the subsequent setpoint image received according to step f) is used as the new subsequent image in the new iteration of steps a) to e).

3. The method according to claim 2, wherein the method comprises in each of the iterations according to step f), temporally after step a), a further step a1) in which a check is made for an enable signal, in order then, if there is a positive enable signal, to continue with steps b) to e) in the iteration and, if there is a negative enable signal, to skip step c) in the iteration of steps b) to e) and, in step d), to replace the intermediate setpoint image (i1, i2, in−1, in) with the subsequent image (S2, S3, Sn, Sn+1) received in this iteration according to step a), wherein there is a positive enable signal if the subsequent image is different from the initial image and there is a negative enable signal if the subsequent image is not different from the initial image.

4. The method according to claim 2, wherein the at least one further setpoint image (S3) received according to step f) is predictively generated from image data of the current initial image (S1) received according to the previous step a) and the current subsequent image (S2) received according to the previous step a).

5. The method according to claim 1, wherein step c) and step d) are carried out simultaneously.

6. The method according to claim 1, wherein in step c), the combination is performed by at least partially interpolating the setpoint image contents from the initial image and the subsequent image.

7. A method for display-optimizing control of a motor vehicle light module (1), wherein the motor vehicle light module (1) is configured to emit a segmented light distribution with individually controllable light segments (51, 53), wherein the motor vehicle light module (1) comprises a deflection unit (4) with which a native resolution of the motor vehicle light module (1) can be visually increased by at least temporary beam deflection by means of the deflection unit (4), wherein the motor vehicle light module (1) is configured to receive setpoint images from a superordinate control unit (10), which setpoint images (S1, S2, S3, Sn, Sn+1) respectively correspond to a light distribution and have a resolution that exceeds the native resolution of the motor vehicle light module (1), wherein the method comprises the following steps:

A) receiving a setpoint image (S1, S2, S3, Sn, Sn+1), also referred to as an initial image, and a subsequent setpoint image (S2, S3, Sn, Sn+1), also referred to as a subsequent image;

B) converting the initial image (S1, S2, S3, Sn, Sn+1) received according to step A) into a low-resolution intermediate image (a1, a2, a3, an, an+1) based on a first conversion rule and into a low-resolution intermediate image (b1, b2, b3, bn, bn+1) based on a second conversion rule, wherein these low-resolution intermediate images (a1, b1, a2, b2, a3, b3, an, bn, an+1, bn+1) are selected in such a way that they have the native resolution of the motor vehicle light module (1);

C) converting the subsequent image (S2, S3, Sn, Sn+1) received according to step A) into a further low-resolution intermediate image (a2, a3, an, an+1) based on the first conversion rule and into a further low-resolution intermediate image (b2, b3, bn, bn+1) based on the second conversion rule, wherein the further low-resolution intermediate images (a2, b2, a3, b3, an, bn, an+1, bn+1) are selected in such a way that they have the native resolution of the motor vehicle light module (1);

D) forming a low-resolution image (A1, A2, An−1, An) from the combination of a low-resolution intermediate image (a1, a2, a3, an, an+1), converted based on the first conversion rule according to step B), and a further low-resolution intermediate image (a2, a3, an, an+1), converted based on the first conversion rule according to step C), wherein the low-resolution image (A1, A2, An−1, An) is selected in such a way that it has the native resolution of the motor vehicle light module (1);

E) forming a further low-resolution image (B1, B2, Bn−1, Bn) from the combination of a low-resolution intermediate image (b1, b2, b3, bn, bn+1), converted based on the second conversion rule according to step B), and a further low-resolution intermediate image (b1, b2, b3, bn, bn+1), converted based on the second conversion rule according to step C), wherein the further low-resolution image (B1, B2, Bn−1, Bn) is selected in such a way that it has the native resolution of the motor vehicle light module (1); and F) controlling the motor vehicle light module (1), the controlling being carried out in such a way that a temporal sequence of the low-resolution images (A1, B1, A2, B2, An−1, Bn−1, An, Bn) formed according to step D) and E) is emitted by the motor vehicle light module (1) in coordination with the temporary beam deflection by the deflection unit (4), wherein the temporal sequence of the emission of the low-resolution images (A1, B1, A2, B2, An−1, Bn−1, An, Bn) formed according to step D) and E) is selected in such a way that the low-resolution image (A1, A2, An−1, An) formed according to step D) and the further low-resolution image (B1, B2, Bn−1, Bn) formed according to step E) are emitted alternately in time.

8. The method according to claim 7, wherein the method comprises a further step G) in which at least one further setpoint image (S3, Sn, Sn+1) is received and then an identical number of iterations of steps A) to F) is carried out according to the number of further setpoint images (S3, Sn, Sn+1) in accordance with the following specification: each received setpoint image (S3, Sn, Sn+1) corresponding to the temporal sequence is utilized in such a way that the current subsequent image received according to the previous step A) is used as the new initial image in a new iteration of steps A) to F), and that the subsequent setpoint image (S3, Sn, Sn+1) received according to step G) is used as the new subsequent image in the new iteration of steps A) to F).

9. The method according to claim 8, wherein the method comprises in each of the iterations according to step G), temporally after step A), a further step A1) in which a check is made for an enable signal, in order then, if there is a positive enable signal, to continue with steps B) to F) in the iteration and, if there is a negative enable signal, to skip steps C) and E) in the iteration of steps B) to F) and, in step F), instead of the temporal sequence of the low-resolution images (A1, B1, A2, B2, An−1, Bn−1, An, Bn), to emit a temporal sequence of the low-resolution intermediate images (a1, b1, a2, b2, a3, b3, an, bn, an+1, bn+1) converted according to step B) in coordination with the temporary beam deflection by the deflection unit (4) through the motor vehicle light module (1), wherein there is a positive enable signal if the subsequent image is different from the initial image and there is a negative enable signal if the subsequent image is not different from the initial image.

10. The method according to claim 8, wherein the at least one further setpoint image (S3) received according to step G) is predictively generated from image data of the current initial image (S1) received according to the previous step A) and the current subsequent image (S2) received according to the previous step A).

11. The method according to claim 7, wherein in at least one step of steps D) and E), the combination is performed by at least partially interpolating the image contents of the low-resolution intermediate images (a1, b1, a2, b2, a3, b3, an, bn, an+1, bn+1).

12. A motor vehicle comprising:

a motor vehicle light module (1), wherein the motor vehicle light module (1) is configured to emit a segmented light distribution, wherein the motor vehicle light module (1) comprises a deflection unit (4) with which a native resolution of the motor vehicle light module (1) can be visually increased by at least temporary beam deflection by means of the deflection unit (4), wherein the motor vehicle has means to carry out the method of claim 1.

* * * * *